United States Patent
Freeby

[15] 3,683,304
[45] Aug. 8, 1972

[54] TEMPERATURE CALIBRATION ASSEMBLY HAVING ADJUSTMENT MEMBER FRICTIONALLY ENGAGED BY A CYLINDRICAL MEMBER FOR SETTING AND CALIBRATION

[72] Inventor: Le Roy W. Freeby, Huntington Beach, Calif.

[73] Assignee: Robertshaw Controls Company, Richmond, Va.

[22] Filed: May 8, 1970

[21] Appl. No.: 35,698

[52] U.S. Cl. ............... 337/347, 236/94, 337/347, 337/392
[51] Int. Cl. ............................................. H01h 37/12
[58] Field of Search......337/392, 388, 384, 382, 347, 337/374; 74/553, 548; 287/53 H; 73/1 F, 363.1; 116/129 A; 64/30 E; 236/94

[56] References Cited

UNITED STATES PATENTS

| | | |
|---|---|---|
| 2,994,755 | 8/1961 | Hildenbrandt, Jr. et al............236/94 X |
| 2,953,937 | 9/1960 | Jackson et al. ............74/504 |
| 2,040,404 | 5/1936 | Persons ...................73/363.7 |
| 2,256,419 | 9/1941 | Tinnerman ...............287/534 |
| 2,863,968 | 12/1958 | Trautman.................337/374 |
| 3,163,043 | 12/1964 | Snider....................337/347 X |
| 3,190,988 | 6/1965 | Graham et al. ........337/260 X |

*Primary Examiner*—J. V. Truhe
*Assistant Examiner*—George A. Montanye
*Attorney*—Auzville Jackson, Jr., Robert L. Marben and Anthony A. O'Brien

[57] ABSTRACT

A clutch spring for use in a calibration assembly including a sleeve-like body having first and second longitudinal edges spaced from each other and a leg extending from one of the longitudinal edges to form a stop. The calibration assembly includes the above described clutch spring gripping a cylindrical clutch surface of a rotatable adjustment member which is adapted to engage a thermostat of the type operating a control device in response to temperature variations and a temperature adjusting device controlling the position of the adjustment member.

16 Claims, 6 Drawing Figures

PATENTED AUG 8 1972
3,683,304
INVENTOR,
LeRoy W. Freeby
BY Anthony A. O'Brien
ATTORNEY
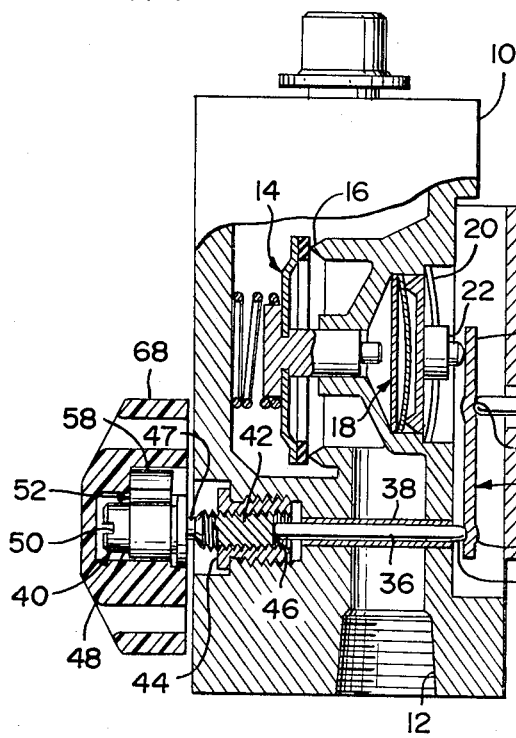
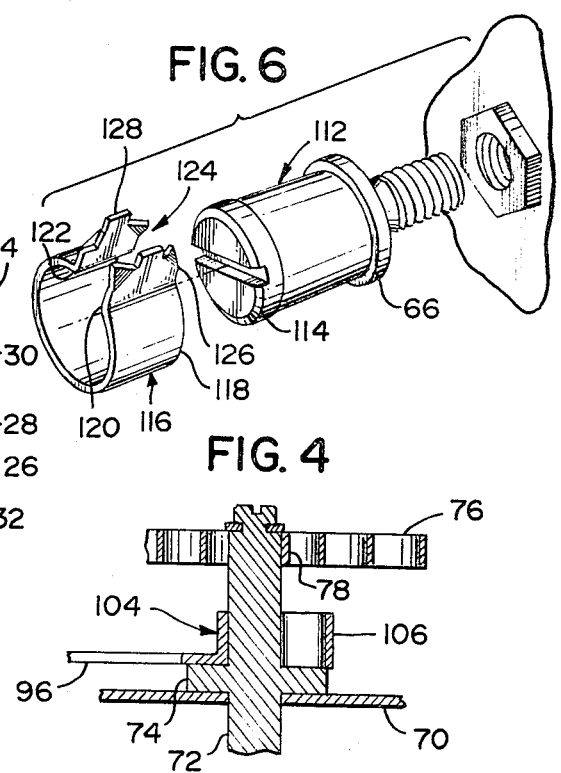
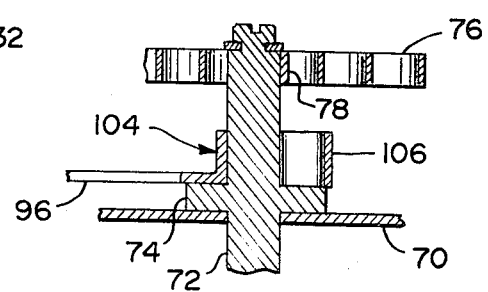
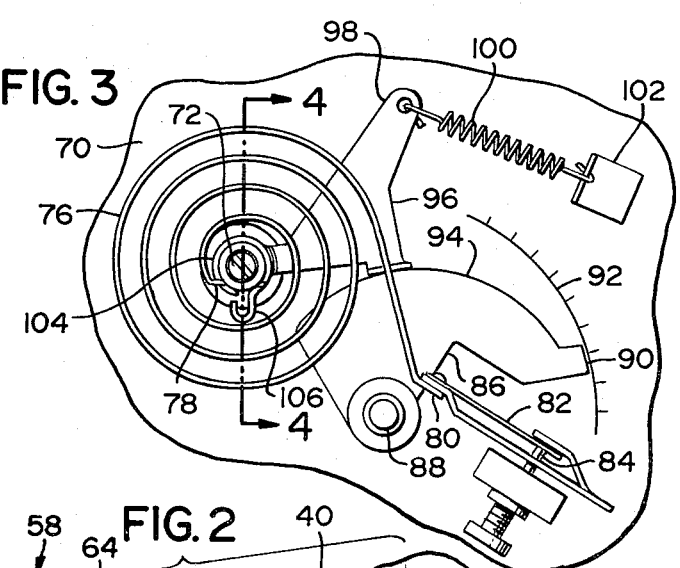
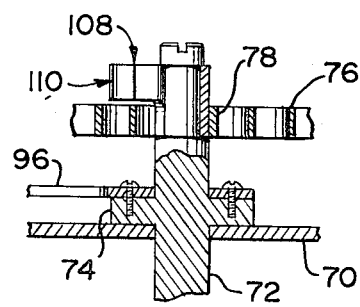
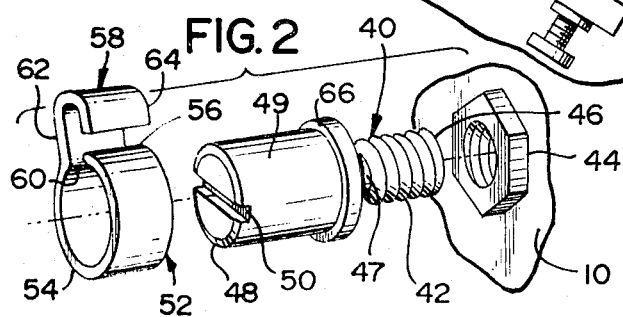

3,683,304

TEMPERATURE CALIBRATION ASSEMBLY HAVING ADJUSTMENT MEMBER FRICTIONALLY ENGAGED BY A CYLINDRICAL MEMBER FOR SETTING AND CALIBRATION

BACKGROUND OF THE INVENTION

1. Field of the Invention

The present invention pertains to clutch springs and, more particularly, to thermostat calibration assemblies utilizing such clutch springs.

2. Description of the Prior Art

Thermostatically operated control devices, such as water heater thermostats and space thermostats, are normally calibrated in the environment in which they are to be used. That is, calibration is performed after installation in order that any adverse effects therefrom may be obviated. In the past such devices have been provided with relatively complex calibration assemblies, and calibration procedures have been more complex than is desirable.

More specifically, for water heater applications rod and tube thermostats are normally utilized to control a valve means in accordance with temperature variations of water in the water heater tank. The rod normally operates at an intermediate position on a lever which has an operating end controlling the valve means through a snap acting actuation mechanism and a fulcrum end which is positioned in accordance with the desired water temperature to be maintained by the water heater. The fulcrum end normally receives an extension rod which is mounted in a casing to abut a temperature adjustment screw. The temperature adjustment screw has a tapered outer peripheral edge, and a stop member is held in place on the edge by engagement with a nut which is threaded on a projecting end of the adjustment screw.

In order to calibrate the water heater thermostat, the nut is tightened to secure the stop, and the water temperature to which the rod and tube are subjected is determined. The stop member is then turned by means of a dial in a first direction to snap the valve means open and then in an opposite direction to snap the valve means closed. The position of the dial when the valve means is closed is determined, and the nut is loosened so that the dial and stop may be moved to the existing known water temperature. The nut is now retightened, and calibration of the thermostat is completed. Reference is made to U. S. Pat. No. 2,953,937 to W.F. Jackson et al. for a more detailed description of the above described prior art calibration assembly and procedure.

Prior art space thermostats have normally utilized spring washers to provide relative movement between a cam follower and a rotatable member to permit calibration of the thermostat. The use of such spring washers requires relatively complex structure and assembly steps due to the need for staking operations and spacing washers. Reference is made to U.S. Pat. No. 3,190,988 to M.M. Graham et al. for a more detailed description of prior art calibration assemblies for space thermostats.

SUMMARY OF THE INVENTION

Accordingly, it is an object of the present invention to construct a calibration assembly for a thermostat which has a reduced member of components and permits simplified calibration procedures.

The present invention is generally summarized in a clutch spring made of a single piece of metal formed to define a sleeve-like body having spaced longitudinal edges and a leg extending from one of the longitudinal edges; and a calibration assembly for a thermostat utilizing the above described clutch spring to couple a rotatable adjustment member with temperature sensing means to permit calibration of the thermostat.

Another object of the present invention is to construct a cylindrical clutch spring having a stop extending therefrom from a single piece of metal.

A further object of the present invention is to reduce the number of components in thermostat calibration assemblies.

The present invention has another object in that a cylindrical clutch spring is used to couple a cam follower with a rotatable post in a space thermostat.

A further object of the present invention is to use a cylindrical clutch spring to couple a temperature sensor to a rotatable post in a space thermostat.

Another object of the present invention is to couple a movable temperature adjusting dial with an adjustment screw in a water heater thermostat.

Some of the advantages of the present invention over the prior art are that the number of calibration assembly components is reduced, assembly procedures are simplified, calibration procedures are simplified, and material and labor costs are reduced.

Further objects and advantages of the present invention will become apparent from the following description of the preferred embodiments taken in conjunction with the accompanying drawing.

BRIEF DESCRIPTION OF THE DRAWING

FIG. 1 is a side elevation, partially in section, of a calibration assembly according to the present invention utilized with a water heater thermostat.

FIG. 2 is an exploded, perspective view of the calibration assembly of FIG. 1.

FIG. 3 is a partial, plan view of a space thermostat utilizing a calibration assembly in accordance with another embodiment of the present invention.

FIG. 4 is a broken section taken along line 4—4 of FIG. 3.

FIG. 5 is a sectional view of a modification of the calibration assembly utilized with the space thermostat of FIG. 3.

FIG. 6 is an exploded, perspective view of a modified calibration assembly according to the present invention.

DESCRIPTION OF THE PREFERRED EMBODIMENTS

A calibration assembly according to the present invention is illustrated in FIG. 1 for use with a water heater thermostat. Water heater thermostats are well known in the art and normally include a casing 10 having an inlet port, not shown, communicating with an outlet port 12 under the control of valve means 14 adapted to cooperate with a valve seat 16 within the casing. The inlet port is adapted to receive fuel from a gas source, not shown, and outlet port 12 is adapted to communicate with a conduit for supplying fuel to a main burner, not shown. Valve means 14 is controlled by a conventional snap acting actuating mechanism 18 including a clicker disc which moves from an inoperative to an operative position through an over-center position with a snap action in response to an applied operating force. Actuating mechanism 18 is retained in an exterior recess formed in the rear wall of casing 10 by means of a bowed washer 20 which is press fitted into the exterior recess along with a diaphragm seal, not shown. The operating force is applied to actuating mechanism 18 by an operating button 22 extending through an opening in washer 20.

Operating button 22 abuts an operating end 24 of a lever 26 having an intermediate recess 28 receiving an end of a rod 30 of a rod and tube temperature sensing assembly which is supported on casing 10 by a flange member 31. A recess is provided at a fulcrum end 32 of lever 26 to receive an end 34 of an extension rod 36 which is disposed within a cylindrical guide 38 in casing 10 so as to be longitudinally movable therein. Rod and tube assemblies conventionally include a copper outer tube which expands and contracts with increasing and decreasing temperatures, respectively; and, rod 30 is normally made of a material having a low coefficient of thermal expansion, such as Invar, such that rod 30 moves operating end 24 of lever 26 away from operating button 22 with increasing temperatures and toward operating button 22 with decreasing temperatures. Lever 26 may be considered to be part of the temperature sensing assembly and must be properly positioned to permit accurate operation of the thermostat at predetermined set temperatures.

A calibration assembly for the control device is illustrated in FIGS. 1 and 2 and includes a rotatable adjustment screw 40 having an externally threaded portion 42 engaging a fitting 44 which threadedly engages a recess in casing 10 and is axially aligned with guide 38. Threaded portion 42 of adjustment screw 40 has an end 46 abutting extension rod 36, and a small diameter shank 47 joins threaded portion 42 with a cylindrical head 48 forming a clutch surface 49 and having a slot 50 in the end thereof. A clutch spring 52 has a sleeve-like body 54 with a longitudinal edge 56. A stop portion 58 extends from body 54 at a longitudinal edge 60 which is arcuately spaced from edge 56, and stop portion 58 is folded upon itself to form a leg 62 extending from longitudinal edge 60 and a leg 64 which is spaced from leg 62 and from body 54. The inner diameter of the sleeve-like body of clutch 52 is slightly smaller than the outer diameter of clutch surface 49 of adjustment screw 40 and when assembled therewith frictionally grips the adjustment screw to turn therewith when the relative torque on the two elements is below a predetermined value. An annular shoulder 66 is formed at the junction of shank 47 and head 48 to limit the positioning of clutch 52 on adjustment screw 40. Clutch 52 is mounted on adjustment screw 40 to abut annular shoulder 66 by utilizing lever action to increase the inner diameter of body 54 of the clutch such as by inserting a screw driver in the space between edge 56 and leg 64 and slightly turning the screw driver.

A temperature adjusting knob 68 has a hollow center to accommodate the calibration assembly and a recess adapted to snugly receive stop portion 58 such that the calibration assembly is indexed with knob 68. Indicia may be placed on the face of casing 10 adjacent knob 68 to correspond to indicia on the knob to permit positioning of the knob in accordance with desired set temperatures.

In operation, the thermostat is mounted on a water heater tank such that the rod and tube extend into the tank to sense the temperature of water therein. The temperature at which valve means 14 opens is controlled by the initial positioning of fulcrum end 32 of lever 26 under the control of adjustment screw 40. When the water temperature within the tank drops below the predetermined temperature, end 24 of lever 26 will be moved towards the control device to operate actuating mechanism 18 and snap open valve means 14 to supply fuel to the burner to increase the water temperature. Once the water obtains the predetermined temperature, lever 26 will be moved sufficiently by withdrawal of rod 30 into the tube to permit valve means 14 to close and stop the flow of fuel to the burner.

In order to calibrate the thermostat the water temperature in the tank is determined and knob 68 is then rotated to correspond to the tank water temperature and removed without moving clutch 52. Clutch 52 is held stationary in any convenient manner such as by inserting a tool in the space between legs 62 and 64 of stop portion 58, and a screw-driver is inserted in slot 50 of adjustment screw 40. Adjustment screw 40 is rotated clockwise within clutch 52 until the fulcrum end 32 of lever 26 is positioned such that actuating mechanism 18 is operated to open valve means 14. Adjustment screw 40 is then rotated counterclockwise within clutch 52 until valve means 14 closes. Knob 68 is then inserted over the stop portion 58 of clutch 52 to frictionally engage the same to cause both the knob and clutch to rotate together. Calibration is now complete, and a predetermined temperature at which it is desired to maintain the water in the water heater may be selected by rotating knob 68 which in turn rotates adjustment screw 40 by means of clutch 52 to longitudinally move extension rod 36 to position lever 26 of the thermostat.

Clutch spring 52 is very simple to construct and is advantageously formed from a single piece of metal such as tempered spring steel. The space between longitudinal edges 56 and 60 permits compression gripping for the clutch and the configuration of the stop portion is advantageous for assembly and calibration. With knob 68 in place, the only force on clutch 52 is approximately 15 in./oz. and the torque differential required for relative movement between adjustment screw 40 and clutch 52 is 15 in./lbs. thereby providing a 16 to 1 calibration maintenance factor.

From the above it may be seen that the clutch spring of the present invention is simple in construction and yet permits the construction of extremely accurate calibration assemblies. That is, the calibration assembly of the present invention requires essentially only a single, two-part step for calibration thereby reducing the room for error. The calibration assembly is further advantageous in that the number of components is reduced, component costs are reduced, calibration procedure is simplified resulting in reduced labor, and calibration is maintained without accidental loosening due to the use of a compression or spring type clutch.

Another embodiment of a calibration assembly according to the present invention, as utilized with a space thermostat, is illustrated in FIGS. 3 and 4. The space thermostat includes a base plate 70 on which is rotatably mounted an adjustment post 72 which is positioned by means of an annular shoulder 74 abutting base plate 70. A spiral bimetal 76 has an inner end 78 spot-welded to post 72 and an outer end 80 carrying a movable electrical contact 82 which is adapted to cooperate with a stationary electrical contact 84 having a magnet associated therewith to form a snap acting electrical switch controlled by the space thermostat. A cam 86 is rotatably mounted on base plate 70 by means of a pin 88 and has a pointer 90 adapted to move adjacent a temperature scale 92 and a cam surface 94 upon which rides a cam follower 96. Cam follower 96 has an apertured leg 98 which receives one end of a bias spring 100 mounted in tension between leg 98 and a stationary block 102 secured to mounting plate 70.

Cam follower 96 engages post 72 by means of a sleeve-like, clutch spring 104 which may be formed integrally with or attached to the inner end of cam follower 96. Clutch 104 has essentially the same configuration as clutch 52 of the embodiment of FIGS. 1 and 2 and has a stop portion 106 extending from the sleeve-like body thereof. Clutch 104 will not be described in detail due to its similarity to clutch 52; however, it should be noted that the inner surface of the body of clutch 104 grips a cylindrical clutch surface on post 72 adjacent annular shoulder 74.

In operation, the space thermostat is mounted such that bimetal 76 senses a space temperature. Assuming the thermostat to be of a heating variety, when the space temperature is above a predetermined set temperature, the electrical control device or switch formed by contacts 82 and 84 will present an open circuit to prevent the supply of electricity to an actuator which supplies fuel to a burner when energized. When the space temperature drops below the set temperature, contacts 82 and 84 will close to energize the actuator and supply fuel to the burner to heat the space. Accordingly, bimetal 76 is constructed so as to rotate counterclockwise with increasing temperature and clockwise with decreasing temperature.

Initial positioning of movable contact 82 controls the temperature at which the electrical switch will be closed, and movable contact 82 is initially positioned by movement of cam 86 such that cam follower 96 is accordingly moved to rotate post 72 and bimetal 76.

In order to calibrate the space thermostat, the existing temperature in the space is determined, and cam 86 is moved such that pointer 90 is aligned with the existing space temperature. Utilizing any convenient tool for engaging stop portion 106 or cam follower 96, clutch 104 and cam follower 96 are held stationary while a screw driver is inserted in a slot in the top of post 72 and rotated counterclockwise until contacts 82 and 84 are open; thereafter, post 72 is rotated clockwise until contacts 82 and 84 snap closed. The space thermostat is now properly calibrated and any predetermined set temperature may be obtained by movement of cam 86.

It may be seen that the cooperation of the clutch spring according to the present invention with a cam follower permits the construction of a calibration assembly having the advantages previously described with respect to the embodiment of FIGS. 1 and 2 as well as the advantages of ease of manufacture and assembly of the components.

A modification of the space thermostat calibration assembly of FIG. 3 is illustrated in FIG. 5 and identical reference numbers are used to identify identical parts which are not described again. The primary difference between the embodiments of FIGS. 3 and 5 is that the clutch spring is secured to the inner end 78 of bimetal 76, and cam 96 is secured to shoulder 74 of post 72 so as to rotate therewith at all times.

The upper portion of post 72 has a reduced diameter to form a clutch surface for engaging a clutch spring 108. The structure of clutch 108 will not be described in detail since it is essentially the same as clutch 52 of FIG. 1; however, a stop portion 110 for clutch 108 does not extend the full longitudinal length of the clutch but rather for only about half the length thereof such that it extends above bimetal 76. It will be appreciated that clutch 108 may be formed integrally with the bimetal or attached thereto.

In order to calibrate a space thermostat utilizing the calibration assembly of FIG. 5, the existing space temperature is determined and cam 86 is moved such that pointer 90 is adjacent the existing space temperature. A screw driver or other such convenient tool is inserted in the space between the folded legs of stop portion 110, and a screw driver is inserted in the groove in the top of post 72. Post 72 is then held stationary while clutch 108 and bimetal 76 are rotated first counterclockwise to open the contacts and then clockwise until the contacts snap closed to complete calibration.

A modified calibration assembly for use with the control device of FIG. 1 is illustrated in FIG. 6 utilizing an adjustment screw 112 substantially the same as adjustment screw 40 of FIG. 1. Adjustment screw 112 has an annular shoulder 114 to define a clutch surface with shoulder 66 and to limit movement of a clutch spring 116 in both longitudinal directions. Clutch spring 116 is similar to clutch 52 in that it has a sleeve-like body 118 having spaced longitudinal edges 120 and 122; however, a stop portion 124 is formed from legs 126 and 128 extending from longitudinal edges 120 and 122, respectively. Legs 126 and 128 each have upwardly extending tabs to aid engagement of knob 68 and bent corners to facilitate assembly of knob 68 with the calibration assembly.

The calibration assembly of FIG. 6 is utilized in the same manner as the calibration assembly of FIG. 2 to calibrate the thermostat of FIG. 1. Of course, clutch 116 may be slightly modified for use with the embodiments of FIGS. 3 and 5.

Inasmuch as the present invention is subject to many variations, modifications and changes in detail, it is intended that all matter contained in the foregoing description or shown in the accompanying drawing shall be interpreted as illustrative and not in a limiting sense.

What is claimed is:

1. In a thermostatic control, the combination comprising a control device movable between controlling positions, temperature sensing means operatively connected to said control device for moving the same between controlling positions in response to variations from a predetermined temperature, temperature setting means operatively connected to said temperature sensing means for positioning the same at the predetermined temperature, said temperature setting means including a rotatable adjustment member having a cylindrical clutch surface, a substantially cylindrical clutch spring normally frictionally engaging said cylindrical clutch surface causing rotation of said adjustment member and said clutch spring as a unit to set said temperature sensing means at the predetermined temperature, and means projecting from said clutch spring and being operable to release said clutch spring from said frictional engagement with said cylindrical clutch surface permitting said adjustment member to be rotated independently of said clutch spring to calibrate said adjustment member relative to the set predetermined temperature.

2. The invention as recited in claim 1 wherein said clutch spring has a sleeve-like body with spaced longitudinal edges and said projecting means includes a stop portion protruding from one of said longitudinal edges.

3. The invention as recited in claim 1 wherein the control device is supported in casing means, the temperature sensing means includes a lever having an operating end operating the control device and a fulcrum end, said temperature setting means engages the fulcrum end of the lever, and said adjustment member has a threaded portion screwed into the casing means whereby rotation of said adjustment member moves the fulcrum end of the lever.

4. The invention as recited in claim 3 wherein said clutch spring has a sleeve-like body gripping said clutch surface of said adjustment member, said projecting means includes a first longitudinal edge spaced from a second longitudinal edge.

5. The invention as recited in claim 4 wherein said clutch spring has a stop portion protruding from one of said longitudinal edges, and said temperature setting means includes a rotatable knob having a recess engaging said stop portion of said clutch spring.

6. The invention as recited in claim 5 wherein said temperature setting means includes an extension rod having a first end engaging the fulcrum end of the lever and a second end engaging said threaded portion of said adjustment member, said adjustment member includes a head defining one end of said clutch surface, said head having an annular collar disposed therearound, and said clutch spring abuts said annular collar.

7. The invention as recited in claim 6 wherein said head of said adjustment member has a second annular shoulder therearound spaced from said first annular shoulder to define the other end of said clutch surface.

8. The invention as recited in claim 1 wherein the control device is supported on a base plate, the temperature sensing means includes a spiral bimetal having a first end operating the control device and a second end engaging said temperature setting means, and said adjustment member is rotatably mounted on the base plate.

9. The invention as recited in claim 8 wherein said temperature setting means includes a cam rotatably mounted on the base plate and a cam follower riding on said cam and having an inner end secured to said clutch spring.

10. The invention as recited in claim 9 wherein said cam follower and said clutch spring are integrally formed.

11. The invention as recited in claim 9 wherein said clutch spring has a sleeve-like body gripping said clutch surface, said sleeve-like body having a first longitudinal edge spaced from a second longitudinal edge.

12. In a space thermostat, the combination comprising a base plate;

a temperature setting means including a rotatable post mounted on said base plate and having a cylindrical clutch surface and a rotatable adjustment means secured to said post and movable to rotate said post;

electric switch means adapted to move between controlling positions;

temperature sensing means having a first end operating said electric switch means and a second end; and a cylindrical clutch spring secured to said second end of said temperature sensing means and normally frictionally gripping said clutch surface of said post, said post being rotatable within said clutch spring under an abnormal torque differential whereby said temperature sensing means may be rotated without moving said post to permit calibration of the thermostat.

13. The invention as recited in claim 12 wherein said rotatable adjustment means includes a cam rotatably mounted on the base plate and a cam follower riding on said cam and having an inner end secured to said post.

14. The invention as recited in claim 13 wherein said temperature sensing means is a spiral bimetal, and said spiral bimetal and said clutch spring are integrally formed.

15. The invention as recited in claim 13 wherein said clutch spring has a sleeve-like body gripping said clutch surface, said sleeve-like body having a first longitudinal edge spaced from a second longitudinal edge.

16. The invention as recited in claim 1 wherein said temperature setting means further comprises means for rotating said adjustment member and said clutch spring, including a knob bearing indicia related to temperature settings.

* * * * *

UNITED STATES PATENT OFFICE
CERTIFICATE OF CORRECTION

Patent No. 3,683,304　　　　　　　　Dated August 8, 1972

Inventor(s) LE ROY W. FREEBY

It is certified that error appears in the above-identified patent and that said Letters Patent are hereby corrected as shown below:

Claim 4, line 3, column 7, line 36, after "member" insert
--and--.

Claim 6, line 7, column 7, line 50, change "collar" to
--shoulder--.

Claim 6, line 8, column 7, line 52, change "collar" to
--shoulder--.

Signed and sealed this 21st day of May 1974.

(SEAL)
Attest:

EDWARD M. FLETCHER, JR.
Attesting Officer

C. MARSHALL DANN
Commissioner of Patents